United States Patent [19]

Kim

[11] Patent Number: 5,050,700

[45] Date of Patent: Sep. 24, 1991

[54] SAFETY APPARATUS FOR A SKID-STEER LOADER

[75] Inventor: In-Keun Kim, Sangok-Dong, Rep. of Korea

[73] Assignee: Daewoo Heavy Industries Ltd., Rep. of Korea

[21] Appl. No.: 522,668

[22] Filed: May 14, 1990

Related U.S. Application Data

[63] Continuation-in-part of Ser. No. 361,302, Jun. 5, 1989, abandoned.

[51] Int. Cl.[5] .............................................. B60R 21/00
[52] U.S. Cl. .................................... 180/268; 180/272; 180/286; 180/89.12; 180/900; 280/801; 188/109; 74/527
[58] Field of Search ............... 180/271, 272, 275, 277, 180/286, 900, 89.12, 268; 280/727, 801, 751, 748; 188/109; 403/92, 146; 74/527

[56] References Cited

U.S. PATENT DOCUMENTS

| | | | |
|---|---|---|---|
| 2,595,193 | 4/1952 | Haug | 74/527 |
| 3,521,285 | 7/1970 | Mautner | 74/527 |
| 4,124,084 | 11/1978 | Albright et al. | 180/6.48 |
| 4,355,819 | 10/1982 | Frisbee | 180/271 |
| 4,388,980 | 6/1983 | Vig et al. | 180/271 |
| 4,391,344 | 7/1983 | Weber et al. | 180/271 |
| 4,397,371 | 8/1983 | Lynnes et al. | 180/271 |
| 4,480,713 | 11/1984 | Macht et al. | 180/271 X |
| 4,579,191 | 4/1986 | Klee et al. | 180/268 |
| 4,673,054 | 6/1987 | Burke et al. | 180/271 |
| 4,955,452 | 9/1990 | Simonz | 180/271 |

Primary Examiner—Charles A. Marmor
Assistant Examiner—Tamara L. Finlay
Attorney, Agent, or Firm—James D. Hall

[57] ABSTRACT

In a skid-steer loader of front type, the present invention offers a safety apparatus for the operator by way of providing a seat bar securely retainable in its desired position, a pair of supporting blocks and a pair of mounting blocks for retaining the seat bar. The safety device further includes a pair of actuating mechanisms for the parking brake operable in response to the pivotal movement of the seat bar.

8 Claims, 4 Drawing Sheets

SAFETY APPARATUS FOR A SKID-STEER LOADER

This is a continuation-in-part of copending application Ser. No. 361,302 filed on June 5, 1989, abandoned.

BACKGROUND OF THE INVENTION

1. Field of the Invention

The present invention relates to a safety apparatus for a skid-steer loader, specifically to a safety apparatus comprising retaining means for a seat bar and actuating mechanisms for a parking brake operating in relation to the movement of the seat bar.

2. Description of the Prior Art

The skid-steer loader of front end type has been broadly used at construction fields. The front end loader generally includes a front opening for the operator to enter or leave its cabin. At the front of the seat, a seat bar is rotatably pivoted at the posts of the cabin to protect the operator under adverse ride conditions, for example, working or driving on rough or sloped land surfaces.

In U.S. Pat. No. 4,397,371, an operator safety system for a front end loader is disclosed. The safety apparatus includes a seat bar whose both ends are rotatably mounted on the opposite side posts of the loader respectively; and a pair of locking members for locking the bucket control linkage in a neutral position. The seat bar may be retained by certain detent members.

Another safety apparatus is disclosed in U.S. Pat. No 4,391,344. This safety apparatus includes a seat bar, a spring biased friction device operatively associated with the pivotal connection of the seat bar, and a locking member for locking the bucket control linkage.

In these prior art safety devices, however, the seat bar could be moved upwards or downwards by an accidental external force under an adverse ride condition or operator's inadvertent movement so that the operator may be injured or the loader may be unintentionally shut down.

Also, in the prior art loaders mentioned above, there is a hand brake connected to the driving mechanisms of the loader by a cable. In such systems, whenever the operator leaves the loader, he should be careful to separately locate the seat bar at the upper position and the hand brake at the parking position.

SUMMARY OF THE INVENTION

The purpose of this invention is, therefore, to provide a safety device or apparatus wherein the operation of the parking brake is controlled and linked directly to the positioning of the seat bar: i.e., the parking brake gets activated or applied when the seat bar is raised to its open or upper position; and the parking brake gets released when the seat bar is placed in its closed or lower position. The present invention further provides safety devices capable of securely retaining the seat bar either in its open(upper) or closed(lower) position.

The skid-steer loader equipped with the safety apparatus of the present invention includes a cabin mounted on the frame of the loader, a front opening, a back side wall and two flank side walls. Typically, a seat bar is rotatably pivoted at the opposite flank side walls. A pair of supporting blocks are attached to both flank side walls to firmly retain the seat bar in its upper or lower position. Additionally, to securely retain the seat bar in the lower position, a pair of mounting blocks are provided on vertical extensions of the flank side walls. As in a typical prior art vehicle, the loader of the present invention possesses a parking brake and a hydraulic control linkage.

The safety apparatus further includes a pair of actuating mechanisms for the parking brake; and a pair of locking members to lock the hydraulic control linkage. Each of the actuating mechanisms has an elongate rod and an actuating lever rotatably mounted on a side portion of the frame and associated with the elongate rod. A cable connected to the parking brake is secured to each of the actuating levers. Each of the actuating mechanisms also includes a guide bar with a spring for biasing the actuating lever in an upward direction. One end of the guide bar is pivoted at a lower portion of the actuating lever and the other end of the guide bar is slidably held in a supporting bracket attached to the frame. In addition, provided at the other end of each guide bar is a retainer which engages with or disengages from a microswitch attached to the frame to indicate the operating condition of the parking brake.

Other and further objects and advantages of the present invention will be apparent from the following description and accompanying drawings which illustrate a preferred embodiment of the present invention.

DETAILED DESCRIPTION OF THE PREFERRED EMBODIMENT

Figure 1:
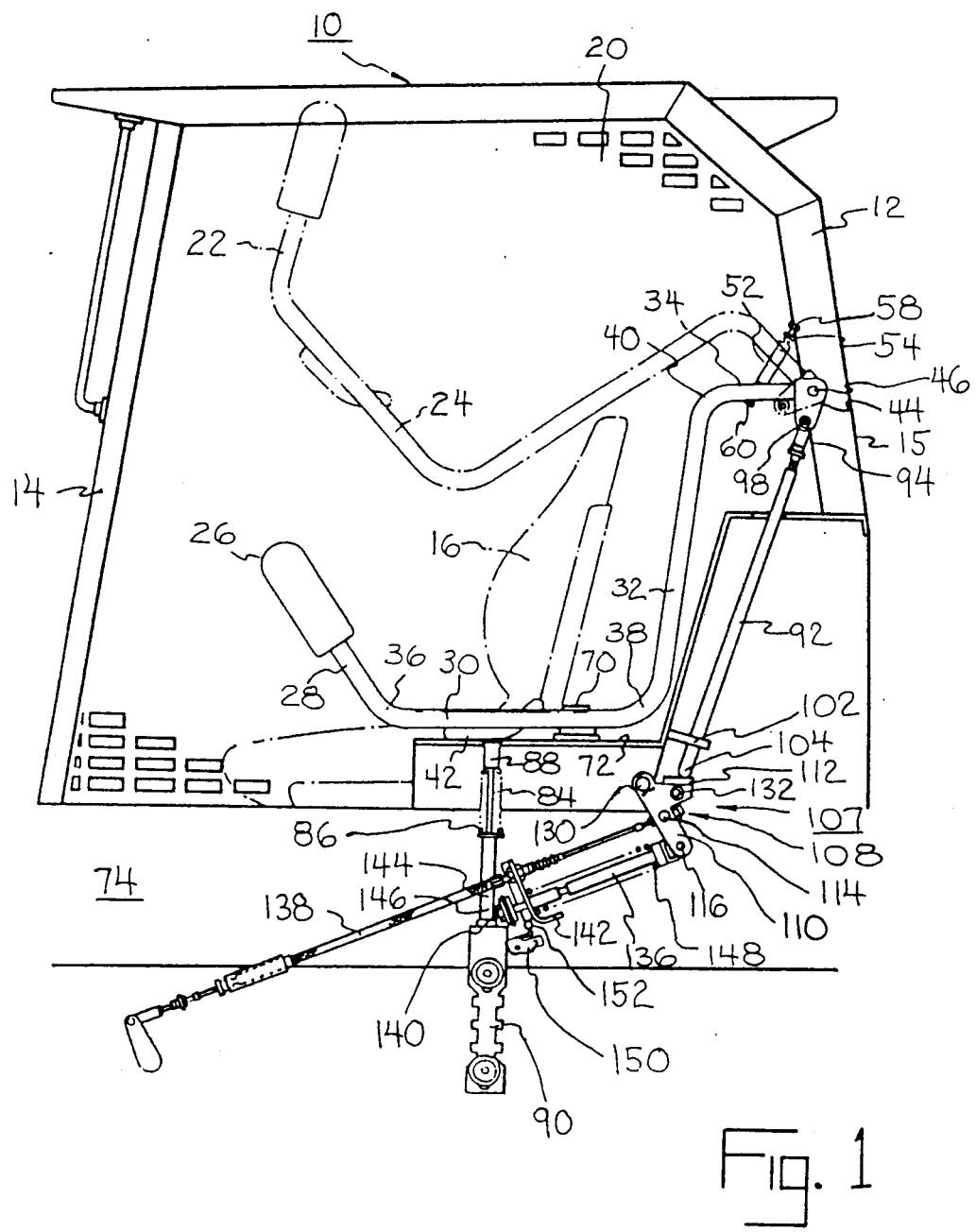
FIG. 1 is a side view of the cabin of a skid-steer loader in accordance with the present invention.
Figure 2:
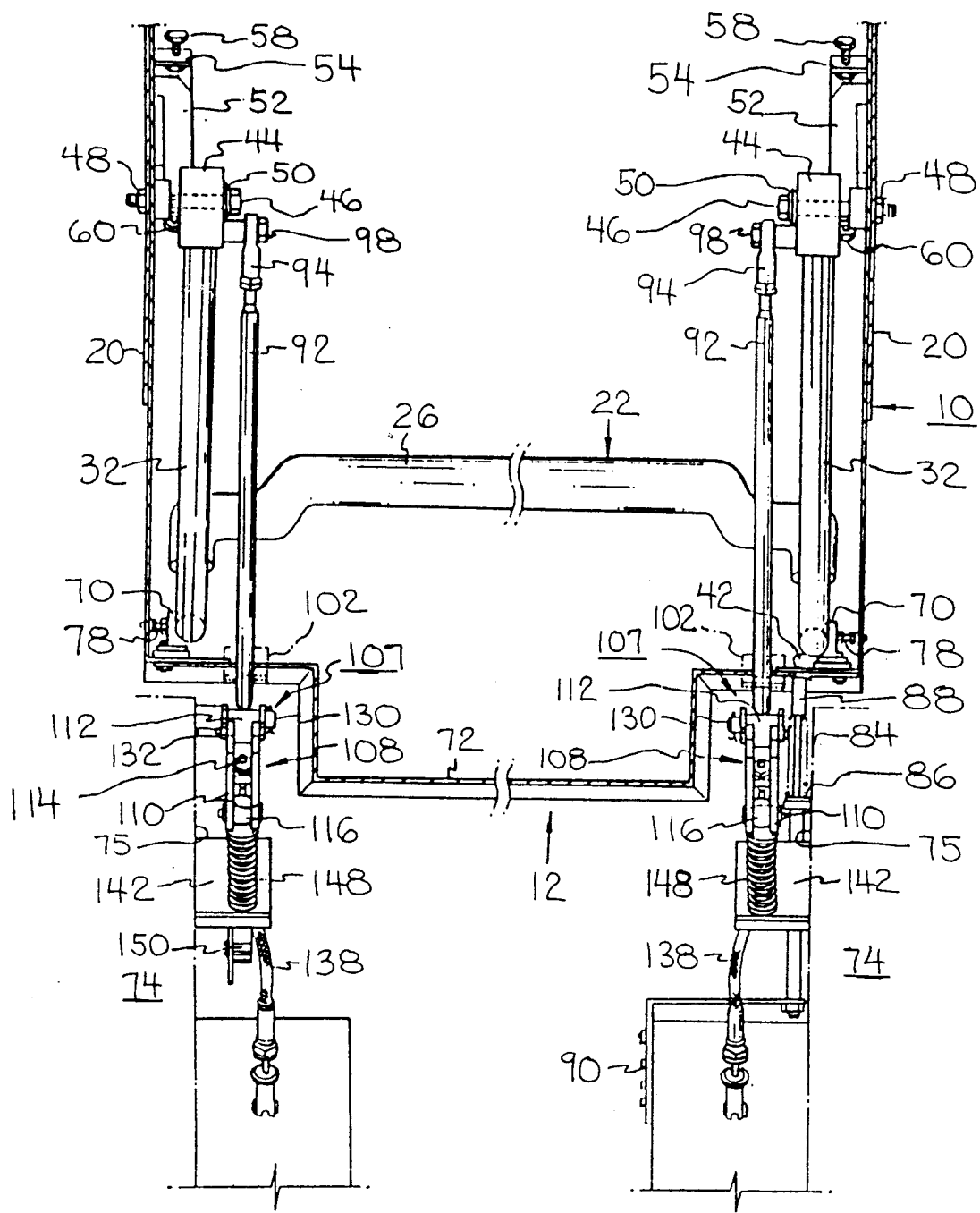
FIG. 2 is a rear view of the cabin of a skid-steer loader with its back side wall and the seat removed.

A skid-steer loader 10 of the present invention, centering on the cabin portion, is shown in FIGS. 1 and 2. The skid steer loader 10 includes a cabin 12 provided with a front opening 14, a back side wall 15 and two flank side walls 20. An operator seat 16 is provided inside the cabin 12.

Figure 3:
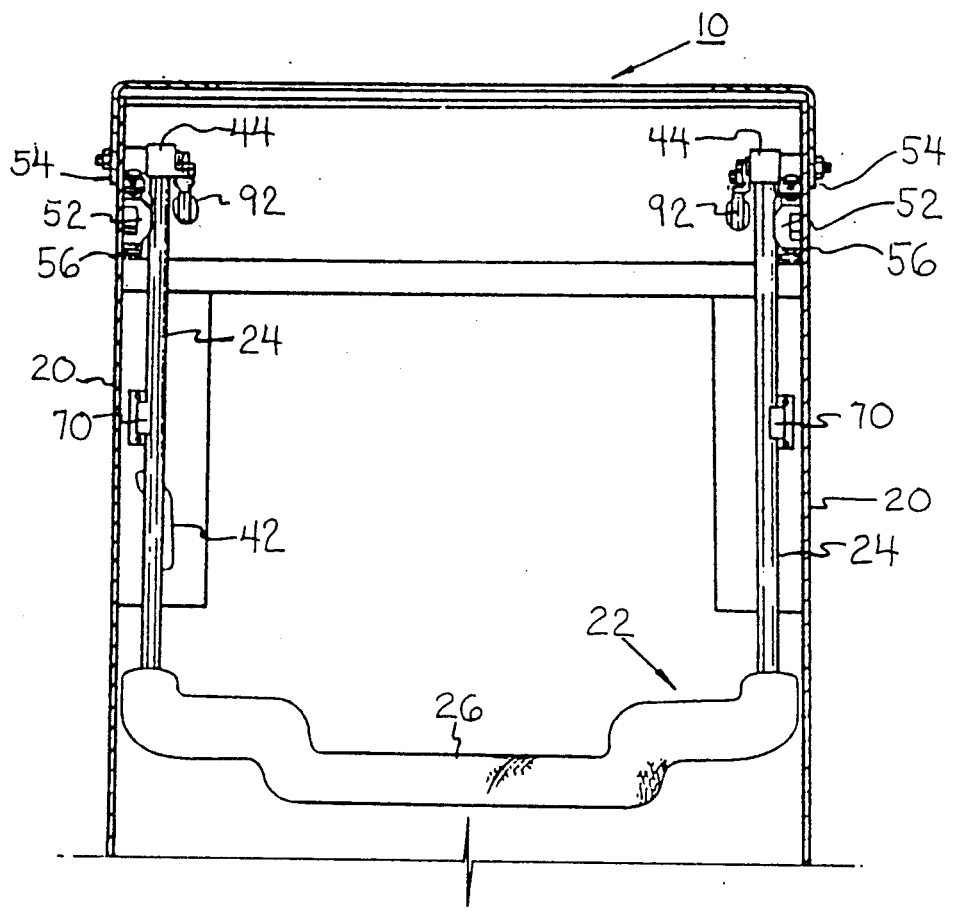
FIG. 3 is a plan view of the seat bar illustrated in FIGS. 1 and 2.

As described in the afore-mentioned U.S. Pat. No. 4,397,371, a seat bar 22 is made of generally resilient pipe; and, as shown in FIG. 3, has two side portions 24 and an elongated middle portion 26 integrally connected to the side portions 24.

Referring to FIG. 1, the seat bar 22 is lifted to its open or upper position as shown in dotted lines when the loader is not in operation; and is lowered to its closed or lower position as shown in solid lines when the loader is in use; and each side portion 24 of the seat bar 22 includes a first section 28, a second section 30, a third section 32 and a fourth section 34.

The first section 28 of the side portion 24 is extended from each end of the middle portion 26 and is connected to the second section 30 by a first bend 36. The second section 30 is connected to the third section 32 by a second bend 38; and the third section 32 is connected to the fourth section 34 by a third bend 40. A contact member 42 is rigidly attached to a middle part of the second section 30.

Figure 4:
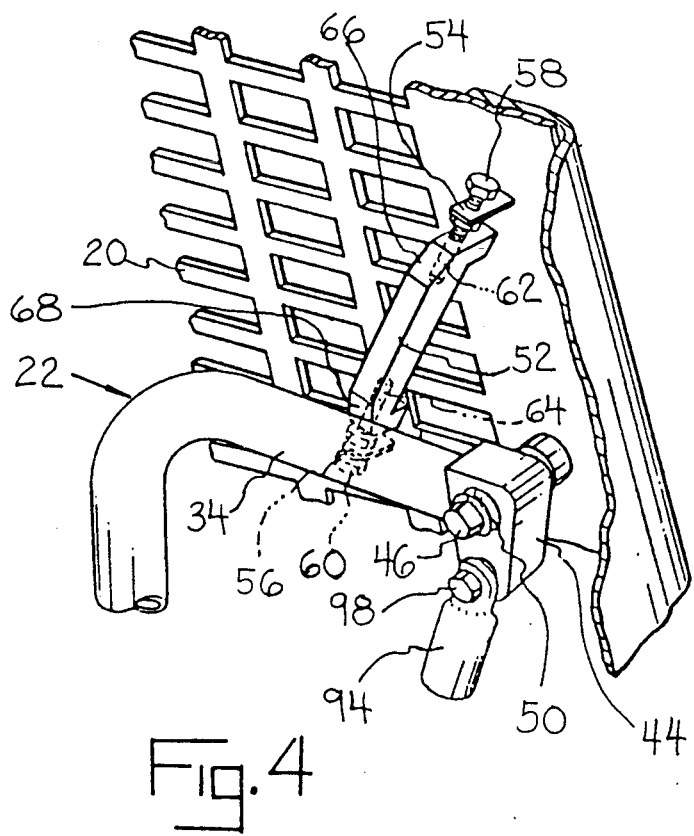
FIG. 4 is a detailed view of the supporting block employed in the present invention.

As shown in FIGS. 2 and 4, a lever 44 is integrally secured to each end of the fourth section. Each lever 44 is rotatably pivoted at a bolt 46 fixed to each flank side wall 20 by a nut 48 and biased outwardly on the bolt 46 by a washer spring 50.

FIG. 4 shows one of the supporting blocks 52 adjustably mounted to an inner portion of the respective flank side walls 20. Each supporting block 52 is identical to the other. Accordingly, only one of them will be described in detail.

To retain the seat bar 22 in its open(upper) or closed(lower) position, the supporting block 52 is held between the two opposite brackets 54,56 integrally attached to the flank side wall 20. Bolts 58,60 are threaded into the respective brackets 54,56; and two respective extensions of the bolts 58,60 are engaged into the opening holes 62,64 provided in the upper and the lower portions of the supporting block 52. Thus, the exact upper or lower position of the seat bar 22 is adjusted by a displacement of the supporting block 52 in accordance with the operation of the bolts 58, 60.

The supporting block 52 includes the upper and the lower inclined facets 66 and 68. The fourth section 34 of the seat bar 22 is engaged with the upper facet 66 when the seat bar 22 is located at its upper position; and the fourth section 34 of the seat bar 22 is engaged with the lower facet 68 when the seat bar 22 is located at its lower position. In other words, as shown in FIG. 2, the seat bar 22 can be reliably retained at its upper or lower position by a cooperative action of the washer spring 50 and the supporting block 52 until the operator changes the position of the seat bar 22.

Figure 5:
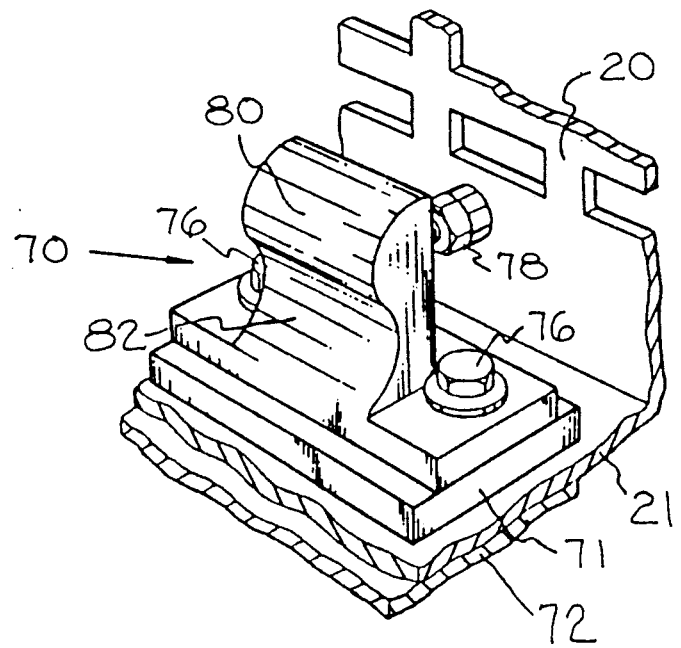
FIG. 5 is a detailed view of the mounting block employed in the present invention.

FIG. 5 shows one of the two mounting blocks 70 which retain the seat bar 22 in the lower position. Each mounting block 70 is identical to the other. Accordingly, only one of them will be described in detail.

The mounting block 70 is secured to a horizontal extension 21 of the side wall 20 through a spacer 71 by a pair of bolts 76. A shelf 72 is attached to the under portion of the extension 21. The mounting block 70 is also supported by a bolt 78 secured to the side wall 20. The mounting block 70 includes a sliding or convex surface 80 continuing to a groove or concave surface 82.

When the seat bar 22 is lowered to its lower position, the second section 30 of the seat bar 22 slides onto the sliding surface 80 of the mounting block 70 and engages with the groove 82 by the resilient force of the seat bar 22. Thus, the seat bar 22 is locked at the lower position as shown in FIG. 1.

A locking member 84 shown in FIG. 1 is similar to that described in the above-mentioned U.S. Pat. No. 4,397,371. The locking member 84 is slidably mounted on the frame 74 to the side of the operator seat 16; and is always pushed upwards by a spring member 86 to lock the hydraulic control linkage(not shown). The locking member 84 includes a contact head 88 at its upper end and a blocking lever 90 at its lower end. When the seat bar 22 is lowered to its lower position, the contact member 42 of the seat bar 22 engages with the contact head 88 of the locking member 84 and moves it downwards so that the blocking lever 90 of the locking member 84 can unlock the hydraulic control linkage.

Referring to FIG. 2, there are two identical actuating mechanisms 107 for the parking brake(not shown), each mounted on each flank side 75 of the frame 74; accordingly, the following explanation will be made with reference to only one of them.

As shown in FIG. 2, the actuating mechanism 107 includes an actuating lever 108 and an elongate rod 92 connected to a ball joint 94 which is pivotally connected to the lever 44 of the seat bar 22 by a bolt 98. Thus, the elongate rod 92 can be moved up and down in accordance with the pivot movement of the lever 44 of the seat bar 22.

Figure 6:
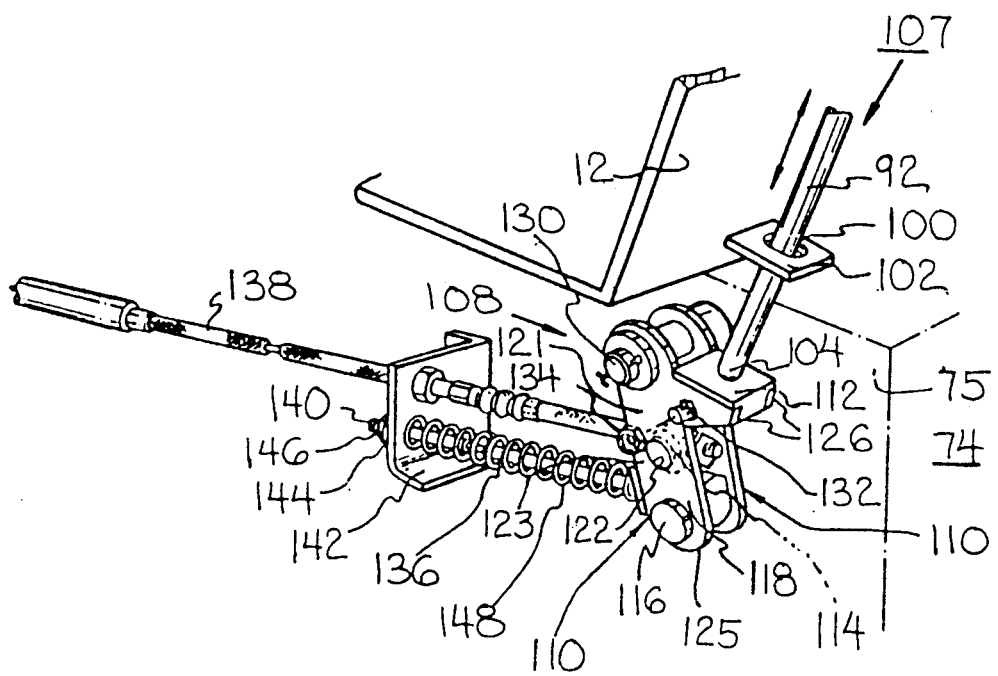
FIG. 6 is a detailed view of the actuating mechanism of the parking brake employed in the present invention.

Further, as shown in FIG. 6, the lower end 104 of the elongate rod 92 is guided by a guide hole 100 of a bracket 102 attached to the cabin 12; and the lower end 104 of the rod 92 pushes a block 112 of the actuating lever 108 when the seat bar 22 is in its lower or closed position.

The actuating lever 108 includes a pair of L shaped brackets 110 spatially disposed and pivotally mounted on a projecting pin 130 which is rigidly secured to the frame 74. Said each L shaped bracket 110 includes a long leg 118 having an upper portion 121, an intermediate portion 123 and a lower portion 125; and a short leg 126 approximately vertically extending from the long leg 118, with the legs 118 and 126 lying on the same plane. As described above, the upper portion 121 of the respective long legs 118 is pivotally mounted onto the pin 130.

The block 112 is inserted between the short legs 126 and fastened by a bolt 132 and a nut 134 so that it is kept in contact with the lower end 104 of the elongate rod 92.

A clevis 114 is rotatably fitted into a pair of clevis holes 122 provided in the intermediate portion 123 of the respective long legs 118 and is also connected to a cable 138 of the parking brake(not shown).

The actuating mechanism also includes an elongate guide bar 136 arranged in parallel to the cable 138 of the parking brake to maintain the pivot movement of the actuating lever 108 in a desired direction. One end of the guide bar 136 is pivoted between the lower portions 125 of the respective long legs 118 by a pin 116. The other end 140 of the guide bar 136 passes through a supporting bracket 142 attached to the frame 74. Additionally, provided to the other end 140 are a nut 146 and a retainer 144 which is in contact with the outer side surface of the supporting bracket 142 at the parking condition of the loader 10. The guide bar 136 is biased by a spring 148 provided thereabout between the actuating lever 108 and the inner side surface of the supporting bracket 142 to maintain the actuating lever 108 on an upwardly pushed condition.

As shown in FIG. 1, a microswitch 150 is attached to the frame 74 adjacent to the retainer 144 to indicate the operating condition of the parking brake and operates a lamp on the control panel(not shown). The microswitch 150 includes a roller 152 which engages with or disengages from the retainer 144. When the actuating lever 108 is pushed downwards by the elongate rod 92 in accordance with a downward movement of the seat bar, the roller 152 disengages from the retainer 144 and the microswitch 150 operates the lamp on the control panel to indicate the releasing condition of the parking brake; whereas when the actuating lever 108 is pushed upwards by the restoring force of the spring 148 applied to the guide bar 136 when the seat bar is moved upward, the roller 152 engages with the retainer 144 of the guide bar 136 and the microswitch 150 operates the lamp on the control panel to indicate the parking condition of the parking brake.

FIG. 1 shows the actuating mechanism of the parking brake while the seat bar is lowered down. When the operator is seated in the seat 16 and locates the seat bar 22 at its lowered position, the lever 44 of the seat bar 22 is pivoted downwards about the bolt 46 and the elongate rod 92 is moved along the guide hole 100 of the bracket 102. Then, the block 112 is pushed downwards by the free end 104 of the elongate rod 92 and the actuating lever 108 is pivoted downwards about the projecting pin 130.

When the actuating lever 108 is located at the downwardly pushed position as shown in FIG. 1, the cable 138 releases the parking brake from its parking condition and the guide bar 136 is pushed downwards against the spring 148 and the retainer 144 is disengaged from the roller 152 of the microswitch 150.

When the seat bar 22 is raised from its lower position to its upper or open position, which causes the lever 44 to pivot upwards, thereby pulling the rod 92, which in turn releases the downward pressure on the actuating lever 108, thereby causing it to move upwards, which upward motion is further aided by the restoring force of the spring 148. As the actuating lever 108 is moved upwards, the cable 138 triggers the parking brake to operate so that the loader is placed in its parking condition and the release of the pressure stored in the spring 148 surrounding the guide bar 136 allows the retainer 144 to move forward to get engaged with the roller 152 of the microswitch 150, which in turn actuates the lamp on the control panel to indicate the parking condition.

In accordance with the safety apparatus of the present invention, the seat bar 22 can be reliably retained in its upper or open position by the cooperative action of the washer springs 50(shown in FIG. 2) and the supporting blocks 52; and also in its lower or closed position by the cooperative action of the supporting blocks 52 and the mounting blocks 70.

Furthermore, in accordance with the present invention, the locking member 84(shown in FIG. 1) for the hydraulic control linkage and the actuating mechanisms for the parking brake can be simultaneously operated by the pivotal movement of the seat bar 22 so that the operator can leave the skid-steer loader without having to separately operate a hand brake.

Although the invention has been described with respect to its preferred embodiment, it should be understood that the present invention is amenable to numerous changes or modifications in actual practice without departing from the spirit and scope of the invention as hereinafter claimed.

What is claimed is:

1. A safety apparatus for a skid-steer loader comprising:
    a frame;
    a cabin mounted on the frame, said cabin having a front opening, a back side wall and two flank side walls;
    a seat bar adapted to restrain or release the operator of the loader, each of said seat bar having a lever integrally secured thereto and rotatably pivoted at a bolt which is fixed to the nearer flank side wall;
    a pair of supporting blocks adjustably mounted on the inner surface of the respective flank side walls for retaining said seat bar in a preselected upper and a preselected lower position, each supporting block having an upper and a lower inclined facets so that said seat bar is engaged with the upper facet when said seat bar is placed in its upper position and is engaged with the lower facet when said seat bar is placed in its lower position;
    a pair of mounting blocks secured to a lower portion of the respective flank side walls, each mounting block having a convex sliding surface and a concave surface adjacent to the sliding surface to retain said seat bar in its lower position;
    a pair of actuating mechanisms adapted to selectively lock or unlock a parking brake of the loader and operating in relation to the positioning of said seat bar, each actuating mechanism having an elongated rod pivotally connected to the lever of said seat bar, an actuating lever pivotally mounted on a side portion of the frame and associated with the lower end of the elongated rod, and means for biasing the actuating lever on an upwardly pushed condition to lock the parking brake wherein said actuating lever is functionally connected to the parking brake through a cable, wherein said each supporting block is held between a pair of brackets integrally attached to its nearer flanked side wall.

2. The safety apparatus of claim 1 wherein said each supporting block may be adjusted by operating a bolt threaded into each of said pair of brackets to fine tune the exact upper or lower position of said seat bar.

3. The safety apparatus of claim 2 wherein each of the elongate rods is slidably supported in a guide hole of a bracket attached to the cabin.

4. The safety apparatus of claim 1 wherein each of the actuating mechanisms includes means for guiding the pivot movement of the actuating lever in a desired direction.

5. The safety apparatus of claim 4 wherein said guiding means includes a guide bar whose one end is pivotally connected to a lower portion of the actuating lever, and whose the other end passes through a supporting bracket attached to the frame and has a retainer secured thereto.

6. The safety apparatus of claim 5 wherein said guide bar is arranged in parallel to the cable of the parking brake.

7. The safety apparatus of claim 5 wherein said biasing means includes a spring provided around the guide bar between the actuating lever and the supporting bracket.

8. The safety apparatus of claim 5 wherein each of the actuating mechanisms includes a microswitch attached to the frame adjacent to the retainer to indicate the operating condition of the parking brake, said microswitch having a roller which may be selectively engaged with or disengaged from the retainer in accordance with the pivot movement of the actuating lever.

* * * * *